United States Patent

Dowd

[11] Patent Number: 4,632,801
[45] Date of Patent: Dec. 30, 1986

[54] BLOWN FILM EXTRUSION

[75] Inventor: Laurence E. Dowd, Arlington Heights, Ill.

[73] Assignee: Norchem, Inc., Rolling Meadows, Ill.

[21] Appl. No.: 779,397

[22] Filed: Sep. 23, 1985

Related U.S. Application Data

[63] Continuation-in-part of Ser. No. 598,255, Apr. 9, 1984, abandoned.

[51] Int. Cl.⁴ .............................................. B29C 47/88
[52] U.S. Cl. .................................. 264/566; 264/569; 264/237; 264/348; 425/72 R; 425/326.1; 425/388
[58] Field of Search ................................ 264/564–569, 264/237, 348; 425/326.1, 72 R, 327, 388

[56] References Cited

U.S. PATENT DOCUMENTS

| | | | |
|---|---|---|---|
| 3,243,486 | 3/1966 | Pilaro | 425/326.1 |
| 3,265,789 | 8/1966 | Hofer | 264/566 |
| 3,307,218 | 3/1967 | Reifenhauser | 425/326.1 |
| 3,507,006 | 4/1970 | Princen | 425/327 |
| 3,568,252 | 3/1971 | Masuda et al. | 425/326.1 |
| 4,259,047 | 3/1981 | Cole | 425/72 R |
| 4,330,501 | 5/1982 | Jones et al. | 425/326.1 |
| 4,373,273 | 2/1983 | Church | 425/326.1 |
| 4,447,387 | 5/1984 | Blakeslee et al. | 425/326.1 |
| 4,472,343 | 9/1984 | Kawamura et al. | 264/565 |
| 4,479,766 | 10/1984 | Planeta | 425/72 R |
| 4,505,657 | 3/1985 | Ikeya | 425/326.1 |

FOREIGN PATENT DOCUMENTS

| | | |
|---|---|---|
| 121158 | 10/1984 | European Pat. Off. . |
| 130909 | 1/1985 | European Pat. Off. . |
| 50-23075 | 8/1975 | Japan .............................. 425/72 R |
| 56-37123 | 4/1981 | Japan . |
| 58-212918 | 12/1983 | Japan .............................. 264/209.5 |
| 58-219021 | 12/1983 | Japan .............................. 264/569 |
| 594490 | 9/1977 | Switzerland . |

Primary Examiner—Jeffery Thurlow
Attorney, Agent, or Firm—Wood, Dalton, Phillips, Mason & Rowe

[57] ABSTRACT

A method of blown film extrusion of polyolefins having high elongational viscosity which is independent of applied stress, and high melt strength wherein a first air ring is disposed adjacent an extrusion die to assist in the formation and stability of a stalk bubble configuration, and a second air ring is disposed downstream of the first air ring to assist in controlled expansion of the bubble at a point where the bubble has dissipated its melt elasticity.

8 Claims, 3 Drawing Figures

FIG. 2
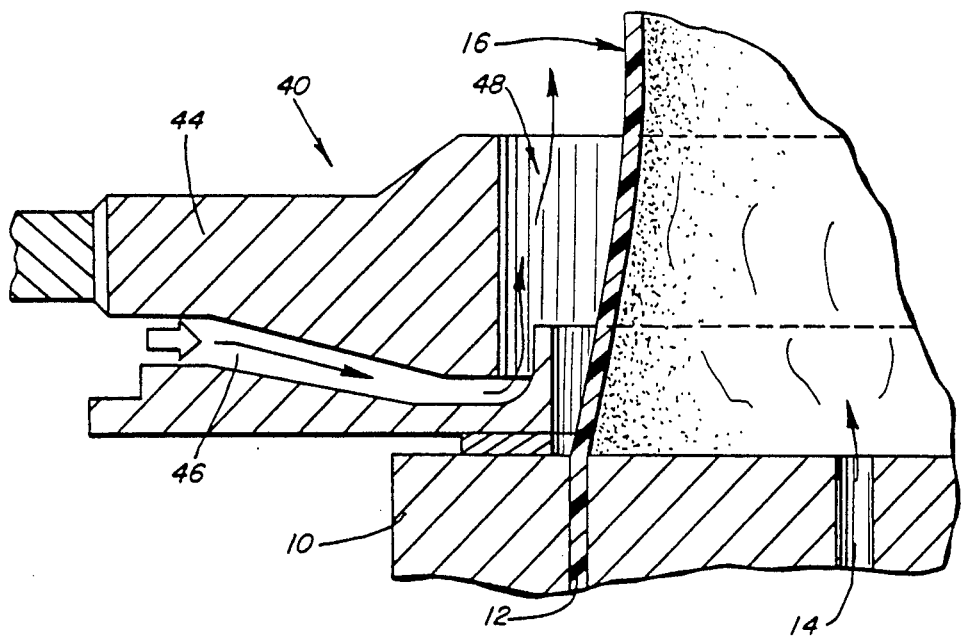
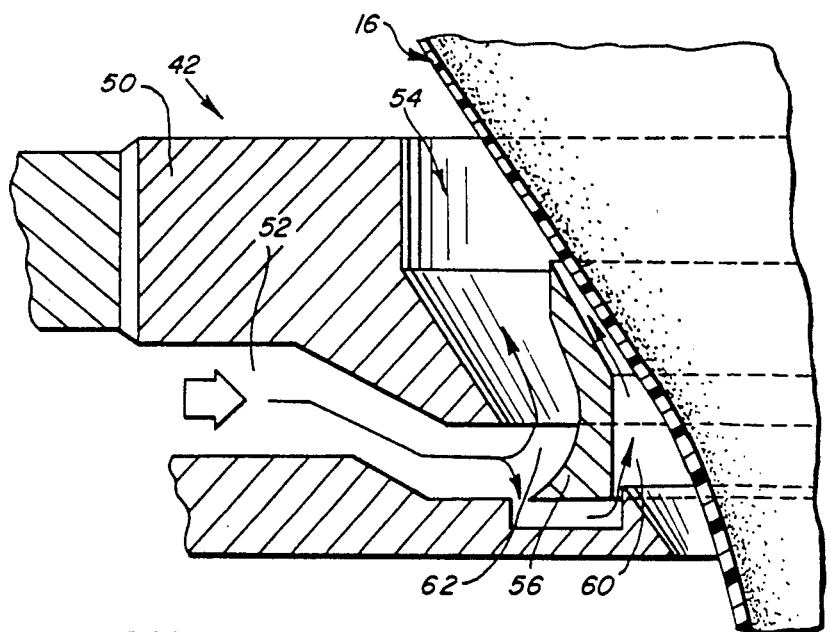
FIG. 3

BLOWN FILM EXTRUSION

CROSS-REFERENCE TO RELATED APPLICATION

This is a continuation-in-part of co-pending, commonly assigned application Ser. No. 598,255 filed Apr. 9, 1984 now abandoned.

BACKGROUND OF THE INVENTION

1. Field of the Invention

This invention relates to blown film extrusion and, more particularly, this invention relates to an improved method for producing polyolefin films by blown film extrusion.

2. Description of the Prior Art

Production of polyolefin film by blown film extrusion is well known. In a typical blown film extrusion process, polyolefin resin is melted in a screw extruder wherein pressure is developed on the molten resin, causing the molten resin to pass through a die having a circular orifice to form a tubular film or sleeve, also known as a "bubble".

Gas, usually air, is provided to the interior of the bubble to inflate it to a desired diameter. The gas is contained within the bubble by the die and by a pair of nip rolls disposed downstream from the die. The nip rolls provide the force to pull the bubble away from the die in a machine direction ("MD") at a desired speed.

The rate of extrusion of the melt, the rate of speed of the nip rolls, and the degree of inflation of the bubble together determine the final thickness of the film.

Between the die and the nip rolls, the melt cools, and undergoes a phase change to the crystalline state. A so-called "frost line" is observable at the point of the bubble at which the phase change occurs.

Conventional blown film extrusion can be generally classified as either a "stalk" process or a "pocket" process.

In stalk extrusion, an air ring, usually a single lip air ring, is disposed adjacent the die and provides stabilizing air flow generally parallel to the machine direction. Thus, the bubble maintains a relatively uniform diameter approximately equal to that of the annular die for a significant distance from the die, and eventually expands in the transverse direction ("TD") to the desired diameter due to the gas pressure within the bubble.

In pocket extrusion, a force is applied by an air ring disposed adjacent the die to cause the bubble leaving the die to immediately expand in the transverse direction at a rate dependent on the design of the air ring. This type of rapid expansion is achieved with a so-called "dual lip" air ring designed to create a vacuum to pull the bubble in the transverse direction.

Single lip air rings are also useful in pocket extrusion, and allow slower expansion of the bubble. Such air rings do not exert as strong an outward force as do dual lip air rings.

Though useful and widely accepted, prior blown film extrusion processes, including prior stalk and pocket extrusion methods, do exhibit disadvantages. Stalk extrusion methods are inherently unstable, with limited output potential, and gauge control is difficult with such methods. Polyethylene films made by pocket extrusion methods are generally not as strong as desired, and sometimes have undesirable optical properties.

Also, the effectiveness of prior methods varies depending on the type of polyethylene resin employed.

For example, with high molecular weight, low density polyethylene, the film reacts adversely to pocket extrusion methods because of the resin,s high melt viscosity and elasticity. While these properties contribute to stability in stalk extrusion, the inherent instability and limited output potential of stalk extrusion methods make them undesirable with some resins. Also, the high degree of molecular orientation that can be attained by stalk extrusion can reduce product tear resistance and stiffness.

SUMMARY OF THE INVENTION

It is an object of the invention to overcome one or more of the problems described above.

According to the present invention, any of a wide variety of polyolefin resins having high melt viscosities which are substantially independent of applied stress at processing temperatures may be extruded by a blown film process using two air rings. A first ring, which is preferably a single lip air ring, is disposed adjacent the die and provides a stabilizing flow of air generally parallel to the machine direction. The film bubble is maintained in a stalk configuration having a maximum diameter substantially equal to that of the die.

A second air ring, which is preferably a dual lip air ring, is positioned downstream from the first air ring at the point where the bubble naturally expands to provide a suction force in the transverse direction to assist in expansion. The second air ring's position is selected such that the resin's melt elasticity has dissipated.

The first air ring stabilizes the bubble without causing expansion, while the second air ring assures that expansion occurs under stable conditions.

Surprisingly, blown film extrusion utilizing two air rings according to the invention provides product films having improved optical properties (i.e., lower haze and higher gloss), improved strength characteristics, and higher output and improved drawdown as compared to prior processes.

The invention is especially useful with those polyethylene resins which have high viscosity and high melt elasticity which will naturally form a long stalk configuration.

Other objects and advantages will be apparent to those skilled in the art from the following detailed description taken in conjunction with the drawings and the appended claims.

BRIEF DESCRIPTION OF THE DRAWINGS

FIG. 2 is a sectional view of a single lip air ring disposed adjacent the die of the apparatus of FIG. 1, taken generally along line 2—2 of FIG. 1; and, FIG. 3 is a sectional view of a dual lip air ring disposed downstream of the die of FIG. 1, taken generally along line 3—3 of FIG. 1.

DETAILED DESCRIPTION OF THE INVENTION

Figure 1:
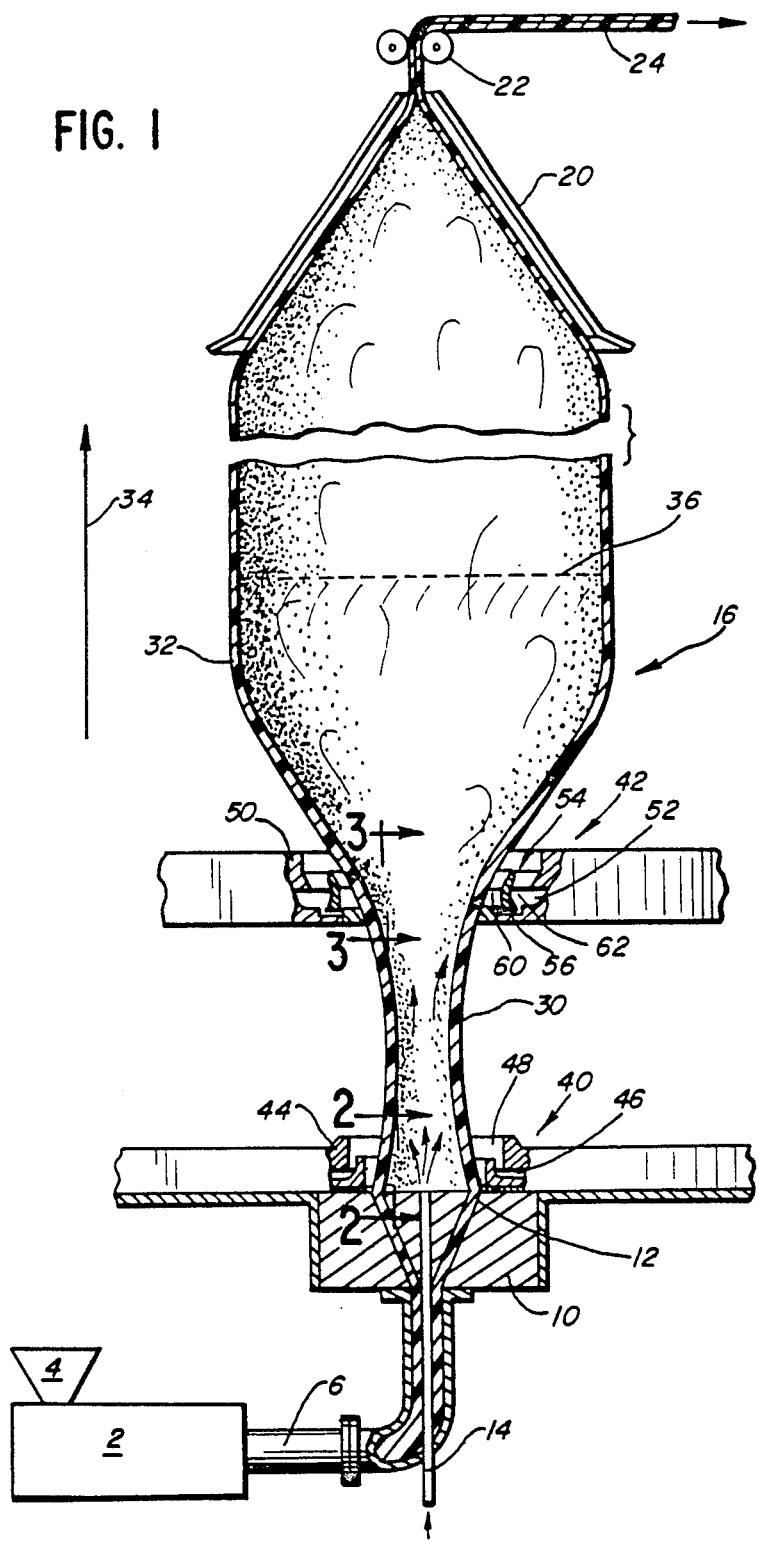
FIG. 1 is a sectional elevation of a blown film extrusion apparatus suitable for carrying out the method of the invention.

Referring to FIGS. 1-3, an apparatus suitable for carrying out the method of the invention is illustrated. In FIG. 1, a thermoplastic resin suitable for forming a film is fed to an extruder 2 by a hopper 4. In the extruder 2, the resin is heated to a molten condition and passed under pressure through a conduit 6 to a die 10 having a circular annular orifice 12. A conduit 14 supplies a gas, typically air, at a desired positive pressure to the inside of a bubble, generally designated 16, formed by the molten resin extruded from the die 10. The bubble is pulled through a collapsing frame 20 by nip rollers 22 which flatten the bubble to a film 24.

The bubble 16 comprises an elongate stalk 30 having a maximum diameter which is substantially equal to that of the die orifice 12 and which extends therefrom. With the high melt strength, high viscosity resins of the invention, the diameter of the stalk gradually decreases in the machine direction and reaches a minimum before expanding. The stalk is generally 20 to 60 inches in length, but may be longer under certain conditions. As is well known in the art, the length of the stalk is a function of numerous variables, including the viscosity and elasticity of the resin, the design and temperature of the passages in the die, the melting temperature of the extruder, the output rate of the extruder, the length and gap of the die lands which define the die orifice, take off speed, and the degree of drawing ("drawdown") among other variables.

The stalk 30 expands to define a bubble region 32 of enlarged diameter. As is well known in the art, the diameter of the region 32 may be several times that of the stalk 30, with blow up ratios ("BUR") of up to 6 being common. The thickness of the bubble wall in the region 32 is correspondingly smaller than the wall thickness in the stalk region 30.

In FIG. 1, the direction represented by the arrow 34 is conventionally defined as the "machine direction". In FIG. 1, the machine direction is depicted to be vertically directed away from the die. While this is most common, it is not critical that the extrusion process take place in the vertical direction.

The direction of expansion of the bubble away from the stalk 30 is a direction which is transverse to the machine direction, and is conventionally referred to as the "transverse direction".

A visible line 36 is located downstream from the die in the bubble region 32 and is conventionally known as the "frost line". This is the point in the bubble 16 at which the molten resin has crystallized to form a solid thermoplastic material. The distance of the frost line from the die varies depending on a number of variables as is well known in the art.

As noted above, the maximum diameter of the stalk 30 is generally substantially equal to that of the die orifice 12. It is to be understood for the purposes of this disclosure, however, that the stalk diameter may be as large as about 1.1 times the orifice diameter in the practice of the invention.

Two air rings, generally designated 40 and 42, are disposed about the bubble 16 at a point adjacent the die 10 and downstream therefrom, respectively.

The air ring 40 is disposed adjacent the die 10 and is preferably the type conventionally referred to as a "single lip" air ring. The air ring 40 includes a body 44 with an air passage 46 communicating with a source of pressurized air (not shown) and with an annular orifice 48 designed to provide a flow of air in a direction which is substantially parallel to the direction of movement of the bubble 16, as seen in FIG. 2.

The air ring 42 disposed downstream of the air ring 40 may be of the type conventionally known as a "dual lip" air ring. Representative dual lip air rings suitable for use in the invention are described in Cole U.S. Pat. No. 4,259,047 (Mar. 31, 1981), the disclosure of which is hereby incorporated by reference.

The air ring 42 comprises a body 50 having an air passage 52 communicating with a source of pressurized air (not shown) and with an annular orifice 54. An annular body member 56 is disposed in the orifice 54 about the bubble 16 to define inner and outer flow passages 60 and 62, respectively. By design, the air stream flowing through passage 60 is of relatively low volume and low velocity, while that flowing through passage 62 is of relatively high volume and high velocity. The cooperative effect of the two air streams is to provide a partial vacuum by the venturi effect to assist in expansion of the bubble 16 in the transverse direction.

The first and second air rings 40 and 42 are coaxial with each other and with the die orifice 12. In FIG. 1, the common axis is defined by the air conduit 14.

According to the invention, a thermoplastic resin is extruded through the die 10 and through the air rings 40 and 42 to provide controlled film formation. The first air ring 40 provides stabilization of the resin, allowing the molten resin to cool and relax without expanding. The second air ring 42 provides controlled expansion at a desired distance from the die. The position of the second air ring 42 is selected to emphasize desired qualities of the product film. The cooperative effect of the air rings 40 and 42 in the system shown in the Figures provides relatively high product output rates, as well as enhanced optical and strength characteristics of the film.

As the resin leaves the die, it has a degree of melt elasticity that depends on the nature of the polymer, the design of the die and the rate of extrusion. This elasticity is a result of deformation of the resin as it passes through the die, and, in cooperation with the viscosity of the resin, it acts as a force within the resin to resist drawing. Drawing leads to the final state, a solid, semi-crystalline polyethylene film having a desired thickness and size.

As the molten resin cools and crystallizes to form a solid film, the degree of drawing and the state of the melt at the time of drawing determine the final physical dimensions and film properties.

When the elastic forces have dissipated to the degree that they are overbalanced by the pressure of gas within the bubble, as well as the drawing force of the nip rolls, the bubble simultaneously expands in the transverse direction and draws in the machine direction. The melt reaches the temperature of crystallization, and changes to a semi-crystalline solid at the frost line 36. This increases the tensile strength of the bubble to offset the forces of drawing and expansion.

According to the invention, the molten resin is allowed to relax (i.e. the melt elasticity is allowed to dissipate) before drawing. When drawing occurs in a relaxed state, i.e. with little if any remaining elasticity, the resin is better able to respond to drawing forces, and thus can be drawn to lower gauges. Impact strength is improved because drawing takes place with a relaxed melt at a temperature just above temperature of crystallization. Thus, proper conditions for development of crystalline structure and orientation are provided.

For various reasons, the method of the invention is not suitable for the type of ethylene/1-olefin copolymer known in the art as "linear low density polyethylene" or for other sensitive resins which do not have sufficiently high viscosities and melt strength necessary for the formation of a long stalk. However, the invention is very desirable for use with those resins having high elongational viscosity and high melt elasticity. These include high density polyethylene and medium density polyethylene, and especially high molecular weight, low density polyethylene (i.e., ethylene homopolymers having densities less than about 0.930 g/cc) and ethylene/vinyl acetate or ethylene/butyl acrylate copolymers. Suitable resins can generally be characterized as ethylene homopolymers made under conditions of high pressure (i.e., at least about 5000 psi, and preferably at least about 15,000 psi, up to about 60,000 psi), ethylene/vinyl acetate or ethylene/butyl acrylate copolymers made under conditions of high pressure, and copolymers of ethylene and 1-olefins having 3 to 8 carbon atoms made at conditions of low pressure (less than about 5,000 psi) and having high densities (i.e. about 0.940 g/cc or above).

Blends and coextruded combinations of suitable materials including but not necessarily limited to those of the type identified above are suitable for production according to the method of this invention.

The resin must have a sufficiently high elongational viscosity which is substantially independent of applied stress (i.e. does not decrease with an increase in applied stress) at the temperature and pressure of extrusion in order to be processed according to the invention. It has been determined that a minimum elongational viscosity of about 350,000 poise at normal extrusion conditions (i.e. 190° C.) is sufficient.

For example, a high pressure ethylene homopolymer (1.0 MI, density=0.922) sold under the trademark Norchem 3401 by Norchem, Inc. has a substantially instant elongational viscosity of 350,000–400,000 poise at 190° C. at an applied elongational stress of about $1.8 \times 10^4$ to about $7.2 \times 10^5$ dyne/cm$^2$. Norchem, Inc. product 3503 is a high molecular weight, low density (0.3 MI, 0.925 density) ethylene homopolymer having a substantially constant elongational viscosity of about 1,100,000–1,500,000 poise at 190° C. and about $2.5 \times 10^5$ to about $1.5 \times 10^6$ dyne/cm$^2$ applied elongational stress.

A typical LLDPE having a melt index of 1.0, on the other hand, exhibits a decrease in elongational viscosity from about 340,000 poise to about 100,000 poise at 190° C. as applied elongational stress is increased from about $0.9 \times 10^5$ to about $3.5 \times 10^6$ dyne/cm$^2$. Such a resin is unsuitable for use in the inventive method. Resins having elongational viscosities of substantially less than 350,000 poise at 190° C. are also unsuitable, even if the viscosity does not vary with applied stress. An example of such a resin is Norchem, Inc. product 3404 which is a low density (1.8 MI, density 0.923) ethylene homopolymer which exhibits an elongational viscosity at 190° C. of about $2 \times 10^5$ poise at an applied elongational stress of about $1.2 \times 10^5$ to baout $5.5 \times 10^6$ dyne/cm$^2$.

It will be understood by those skilled in the art that the viscosity of the polyolefin material may be less than 350,000 poise at the actual temperature of extrusion, which may range up to 220° C., or even higher in some cases.

Because of the varying properties of suitable resins, the spacing between the air rings 40 and 42 is adjustable. Also, operation with a single resin under varying conditions allows the production of products having different properties by varying the spacing of the air rings. As noted above, the spacing is generally within the 20 to 60 inch range, although greater spacings are entirely operable.

Die lip gaps and diameters can vary over a wide range. Generally, the die lip gap will be in the range of 25-110 mils, with a gap of 40 to 70 mils being preferred. A die diameter of about 8 inches is typical.

If desired, a stabilizing iris may be positioned downstream from the second air ring. The space between the air rings 40 and 42 need not be sealed. It should be noted, however, that the effectiveness of the invention is not dependent upon the spacing of the air rings or the use of a sizing cage, as is characteristic of some prior art processes. If desired, the inventive process can be started with the upper air ring close to the lower air ring, with the operator raising the upper air ring to its desired ultimate position once the stalk has been established.

Since the second air ring 42 is positioned at a point selected to coincide at the point at which the bubble 16 naturally expands, expansion is stabilized and occurs after the melt elasticity of the resin has dissipated. As a result, strength is improved and higher output rates are achieved. Compared with prior stalk extrusion methods, the second air ring improves bubble stability, gauge uniformity, and extrusion rates. Also, optical properties are improved.

For example, a comparison of properties obtainable by means of the invention compared to film products obtained by means of prior pocket and stalk extrusion methods is shown below.

|  | Pocket | | | |
| --- | --- | --- | --- | --- |
|  | Dual-lip | Single-lip | Stalk | Invention |
| Haze, % | 6.9 | 6.3 | 6.0 | 4.8 |
| Gloss | 59 | 64 | 68 | 72 |
| TEDD*, ft.-lb. | 0.6 | 1.0 | 2.0 | 1.0 |
| Thickness, mil | 1.3 | 1.3 | 1.0 | 1.0 |
| Output, pph | 280 | 280 | 275 | 380 |

*Total energy dart drop

The foregoing values were obtained using a high molecular weight, low density (0.924 g/cc) ethylene homopolymer having a melt index (MI) of 0.3, marketed by Norchem, Inc., Rolling Meadows, Ill. under the trade designation "3503".

The foregoing data illustrate another important advantage of the invention over prior pocket extrusion processes, namely the improvement in drawdown obtainable due to the relaxation of the melt in the invention. In the foregoing, 1.3 mil film was produced in the pocket extrusion examples due to the inability to draw the particular resin to a lower gauge in pocket extrusion. According to the invention, on the other hand, a 1.0 mil film was obtained.

The economies of production according to the invention reflect two advantages thereof over prior product extrusion processes. Firstly, drawing of film to a lower gauge results in significant material savings. (For example, a 23% savings is reflected in the foregoing data.) Secondly, downgauging of the film in combination with increased output results in a significant increase in the production rate of useable film. (For example, the foregoing data reflect a production increase of about 76% ($380/280 \times 1.3 = 1.76$).)

EXAMPLES

The following specific examples will illustrate various advantages of the invention as compared to the prior art.

EXAMPLE 1

Using an apparatus as shown in FIG. 1, a Gloucester Engineering Corp. (Gloucester, Mass.) (GEC) single-lip air ring is mounted adjacent the die. A Uni-Flo Design, Inc. (Brampton, Ontario, Canada) dual-lip air ring is mounted on an iris frame for adjustable movement above the die. Film samples designated A through J of various gauges were produced, using Chemplex (now Norchem) 3503C polyethylene in Samples A-C, and Chemplex (Norchem) 3503A polyethylene for Samples D-J. An 8" diameter coextrusion die, fed by one 2.5" and two 2.0" extruders was used.

The data for 1.0 mil films is shown below in Table I, the data for 2.0 mil films is shown in Table II, and the data for other gauges is shown in Table III. For comparison (in Table I) data for 3503A extruded at a high rate for each air ring alone is shown. The single air ring data is for 280 pph, 2/1 BUR, with a target gauge of 1.25 mil.

The comparisons clearly show the advantages of using the two air rings in the tandem configuration of the invention. The same die, the same three extruders, and the same lot of resin was used with each air ring configuration. The two air rings used in tandem were the same two as were run separately. The advantages of the tandem configuration apparent from the results are:

1. Substantially improved optical properties—

|  | Single Air Ring | Tandem Air Ring |
|---|---|---|
| Haze | 6.9% dual-lip Uni-Flo | 3.8% @ 1.7/1 BUR |
|  | 6.3% single-lip GEC | 4.8% @ 2.6/1 BUR |
| Gloss | 59 dual-lip Uni-Flo | 77 @ 1.7/1 BUR |
|  | 64 single-lip GEC | 72 @ 2.6/1 BUR |

2. Improved impact strength (TEDD-ft.lb.) at lower gauge—

| Single Air Ring-1.3 mil | Tandem Air Ring |
|---|---|
| 0.6 dual-lip Uni-Flo | 1.2 @ 1.7/1 BUR, 1.1 mil |
| 1.0 single-lip GEC | 1.0 @ 2.6/1 BUR, 1.0 mil |

3. Output increased from 280 pph to 380 pph.

TABLE I

COMPARISON OF 1 MIL FILM PROPERTIES

| Sample | Tandem Air Rings B | G | J | Uni-Flo Dual Lip | GEC Single Lip |
|---|---|---|---|---|---|
| Gauge, Mil | 1.03 | 1.10 | 0.97 | 1.28 | 1.31 |
| Output, pph | 180 | 315 | 380 | 280 | 280 |
| Blow-up Ratio | 1.55/1 | 1.7/1 | 2.6/1 | 2/1 | 2/1 |
| Haze, % | 3.8 | 3.8 | 4.8 | 6.9 | 6.8 |
| Gloss, 45° | 77 | 77 | 72 | 59 | 64 |
| NAS, % | 56 | 66 | 63 |  |  |
| TEDD, ft.-lb. |  |  |  |  |  |
| Flat | 1.4 | 1.2 | 1.0 | 0.6 | 1.0 |
| Creased | 0.4 | 0.5 | 0.6 | 0.2 | 0.3 |

TABLE II

COMPARISON OF 2 MIL FILM PROPERTIES

| Sample | A | F | H |
|---|---|---|---|
| Gauge, mil | 1.98 | 2.16 | 1.93 |
| Output, pph | 190 | 315 | 314 |
| Blow-up Ratio | 1.55/1 | 1.65/1 | 2/1 |
| Haze, % | 4.5 | 5.1 | 4.4 |
| Gloss, 45° | 82 | 81 | 80 |
| NAS, % | 52 | 58 | 60 |
| TEDD, ft.-lb. |  |  |  |
| Flat | 1.8 | 1.6 | 1.6 |
| Creased | 0.7 | 0.6 | 0.8 |
| 1% Secant Modulus, psi |  |  |  |
| MD | 28100 |  |  |
| TD | 31200 |  |  |

TABLE III

FILM PROPERTIES AT OTHER GAUGES

| Sample | I | C | D | E |
|---|---|---|---|---|
| Gauge, mil | 1.45 | 2.93 | 3.07 | 4.03 |
| Output, pph | 380 | 190 | 315 | 315 |
| Blow-up Ratio | 2.5/1 | 1.55/1 | 1.65/1 | 1.65/1 |
| Haze, % | 4.3 | 6.1 | 6.4 | 8.3 |
| Gloss, 45° | 78 | 82 | 78 | 75 |
| NAS, % | 61 | 45 | 55 | 45 |
| TEDD, ft.-lb. |  |  |  |  |
| Flat | 1.3 | 2.0 | 2.1 | 2.8 |
| Creased | 1.1 | 1.4 | 1.0 | 1.5 |

The foregoing detailed description is given for clearness of understanding only, and no unnecessary limitations should be inferred therefrom, as modifications within the scope of the invention will be obvious to those skilled in the art.

I claim:

1. In a method of making polyolefin film comprising the steps of extruding molten polyolefin material through an annular die to form a tubular film, withdrawing said tubular film from said die in a machine direction, and expanding said tubular film in a direction transverse to said machine direction by maintaining a positive gas pressure therein, said tubular film defining first and second regions generally coaxial with said die, said first region being adjacent said die and extending therefrom in said machine direction and having a maximum diameter substantially equal to the diameter of said die, said second region extending in said machine direction from said first region at a point of intial expansion of said film and having a diameter substantially greater than those of said die and said first region with a frost line located downstream in said machine direction from said point of initial expansion, the improvement wherein said polyolefin material is selected from homopolymers of ethylene made under high pressure conditions, copolymers of ethylene and one or more members of the group consisting of vinyl acetate and butyl acrylate made under high pressure conditions, and high density copolymers of ethylene and 1-olefins having three to eight carbon atoms made under low pressure conditions, said polyolefin material having an elongational viscosity of at least about 350,000 poise at 190° C., and which is substantially independent of applied stress at the temperature of extrusion and wherein a first air ring coaxial with said die and said tubular film is positioned about said tubular film adjacent said die to provide air flow in a direction parallel to said machine direction to stabilize said film without allowing substantial expansion thereof, and a second air ring is positioned about said tubular film at said point of initial to provide suction force in said transverse direction to assist in said expansion and cooling and maintain the stability of said film.

2. The improvement of claim 1 wherein said polyolefin material is an ethylene homopolymer having a density of less than about 0.930 g/cc.

3. The improvement of claim 1 wherein said polyolefin material is a copolymer of ethylene and vinyl acetate.

4. The improvement of claim 1 wherein said polyolefin material is a copolymer of ethylene and butyl acrylate.

5. The improvement of claim 1 wherein said polyolefin material is a copolymer of ethylene and a 1-olefin having three to eight carbon atoms made under a pressure of less than about 5,000 psi and having a density of at least 0.940 g/cc.

6. The improvement of claim 1 wherein said first air ring is a single lip air ring and said second air ring is a dual lip air ring.

7. The improvement of claim 1 wherein said second air ring is spaced between about 20 inches and 60 inches above said first air ring.

8. The improvement of claim 1 wherein the diameter of said second air ring is substantially identical to the diameter of said first air ring.

* * * * *